(12) United States Patent
Daniel et al.

(10) Patent No.: US 6,366,422 B1
(45) Date of Patent: Apr. 2, 2002

(54) HELICAL SCAN TAPE DRIVE ERROR RECOVERY USING TRACK PROFILE MAPPING

(75) Inventors: David B. Daniel, Longmont; Fred Eifert, Eaton; Douglas Christian Hansen, Boulder; David Lawson, Arvada; Thai Nguyen, Thornton, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/283,170

(22) Filed: Apr. 1, 1999

(51) Int. Cl.$^7$ ................................................ G11B 5/00
(52) U.S. Cl. ................................................ 360/76
(58) Field of Search .............................. 360/76, 77.16, 360/75, 77.01; 386/23, 74, 78

(56) References Cited

U.S. PATENT DOCUMENTS

| | | | |
|---|---|---|---|
| 4,420,778 A | * 12/1983 | Sakamoto | 360/77.01 |
| 4,539,615 A | 9/1985 | Arai et al. | |
| 4,550,351 A | 10/1985 | Hamalainen | |
| 4,595,960 A | * 6/1986 | Hamalainen et al. | 360/77.01 |
| 4,688,109 A | * 8/1987 | Sangu | 360/77.01 |
| 5,274,515 A | 12/1993 | Furuyama | |
| 5,307,217 A | 4/1994 | Saliba | |
| 5,321,570 A | 6/1994 | Behr et al. | |
| 5,325,370 A | 6/1994 | Cleveland et al. | |
| 5,369,641 A | 11/1994 | Dodt et al. | |
| 5,371,638 A | 12/1994 | Saliba | |
| 5,478,021 A | 12/1995 | Davis et al. | |
| 5,566,032 A | 10/1996 | Cleveland et al. | |
| 5,969,898 A | * 10/1999 | Hansen et al. | 360/77.16 |

FOREIGN PATENT DOCUMENTS

EP  0 508 827 A  10/1992

* cited by examiner

*Primary Examiner*—David Hudspeth
*Assistant Examiner*—K. Wong
(74) *Attorney, Agent, or Firm*—Brooks & Kushman P.C.

(57) ABSTRACT

It is difficult to read data from curved helical data tracks in a helical scan tape drive. Curved helical tracks can be caused by improper tape tension, tape damage, tape path misalignment, tape head offset between different head systems, and debris. The present invention solves the problem of recovering data from curved helical tracks by providing a table of different curve offset signals. Each curve offset signal represents a curve track profile of a typical curved track. The position of the helical read head reading a curved data track is controlled as a function of one of the curve offset signals such that the read head is positioned properly with respect to the helical data track to provide a proper read back signal. The curve offset signals are selected one at a time to control the position of the helical read head until the helical read head provides a proper read back signal.

6 Claims, 3 Drawing Sheets

HELICAL SCAN TAPE DRIVE ERROR RECOVERY USING TRACK PROFILE MAPPING

TECHNICAL FIELD

The present invention relates generally to helical scan tape drives and, more particularly, to reading data of magnetic tape that is unreadable due to curved or displaced data tracks in a helical scan tape drive.

BACKGROUND ART

The helical systems of recording digital data on magnetic tape include a fixed head system and a helical scan system. The fixed head system forms recording tracks in the longitudinal direction on the magnetic tape by means of fixed heads. The helical scan system forms recording tracks at an angle with respect to the edge of the magnetic tape by means of rotary heads (i.e., helical heads). The helical scan system is useful for high density recording.

When data is recorded onto the magnetic tape, the data is not written verbatim because of the importance of data integrity. Instead, additional characters are calculated and added to the data as it is written. This process, known as error correction coding (ECC), allows the original data to be reconstructed at a later date even if a small number of data bits become damaged and unreadable.

When the helical system is instructed to read a certain file, the system positions the magnetic tape at the beginning of the file of interest and begins reading the data. The ECC is used to check the integrity of the data and correct any errors that are short in duration. The system stops reading the data and repositions to the beginning of the error region when the error is too long in duration for the ECC to correct. The system then attempts to reread the region of tape where the error occurred. Most read errors are caused by debris contaminating the read heads. The debris is sometimes dislodged during the reread attempt which makes the data readable. The reread operation is then attempted again if the data remains unreadable. The system quits after a certain number of retries and indicates that the data is unrecoverable.

Sometimes all or a large fraction of the data becomes unreadable for a long duration because the recorded helical data tracks are curved or are displaced from their specified locations. Curved tracks occur when the edge of the tape is damaged, the tape is subjected to improper tension, the tape path is misaligned, the tape is read by different head systems that have offsets, or debris contaminates the guides in the tape heads. Most practical ECC are only able to correct short and intermittent data errors. A long error, however, is generally not correctable by the ECC.

DISCLOSURE OF THE INVENTION

Accordingly, it is a general object of the present invention to provide a method and system for reading data of magnetic tape that is unreadable due to curved or displaced helical data tracks in a helical scan tape drive.

It is another object of the present invention to provide a method and system for reading data that is normally unreadable due to curved or displaced helical data tracks by controlling the position of the helical read heads with respect to the helical tracks as a function of historical position data of typical curved and displaced helical tracks.

It is a further object of the present invention to provide a method and system for reading data of magnetic tape that is unreadable due to curved or displaced helical data tracks by selecting one of a plurality of curved and displaced helical track profiles stored in memory and then controlling the position of the helical read heads with respect to the helical tracks as a function of the selected helical track profile.

In carrying out the above objects and other objects, the present invention provides a helical scan tape drive including a read head for reading a helical data track on magnetic tape to generate a read back signal. A position sensor generates a position signal indicative of a position of the read head with respect to the helical data track. A plurality of curve offset signals are stored in memory. Each one of the plurality of curve offset signals represents a curve profile of a respective given curved helical data track. A controller positions the read head as a function of the position signal and one of the plurality of curve offset signals such that the read head is positioned properly with respect to the helical data track to provide a proper read back signal when the helical data track is curved.

In further carrying out the above objects and other objects, the present invention provides a method for reading a helical data track of a helical scan tape drive. The method includes reading a helical data track on magnetic tape with a read head to generate a read back signal. A position signal is then generated to indicate a position of the read head with respect to the helical data track. A plurality of curve offset signals is stored in memory. Each one of the plurality of curve offset signals represents a curve profile of a respective given curved helical data track. The position of the read head is then controlled as a function of the position signal and one of the plurality of curve offset signals such that the read head is positioned properly with respect to the helical data track to provide a proper read back signal when the helical data track is curved.

These and other features, aspects, and embodiments of the present invention will become better understood with regard to the following description, pending claims, and accompanying drawings.

BEST MODES FOR CARRYING OUT THE INVENTION

Figure 1:
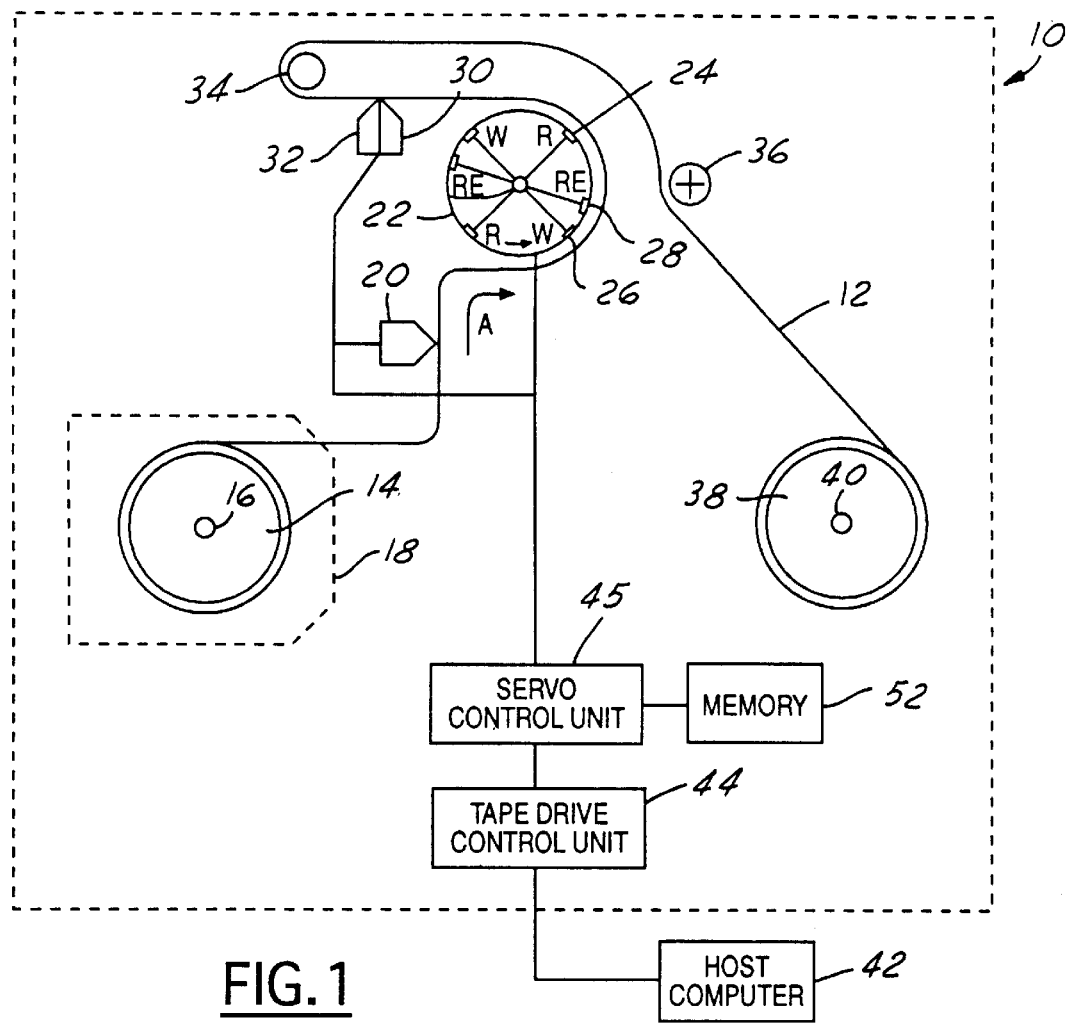
FIG. 1 illustrates in block diagram form a helical scan tape drive in accordance with the present invention.

Referring now to FIG. 1, a helical scan tape drive 10 in accordance with the present invention is shown. Helical scan tape drive 10 is used to read and write data on magnetic tape 12. Magnetic tape 12 is wound on a single reel 14 which rotates around a spindle 16 within a magnetic tape cartridge 18. In helical scan tape drive 10, magnetic tape 12 from magnetic tape cartridge 18 is threaded in direction A past a fixed full width erase head 20, scanner 22 (which contains two pairs of helical read heads 24, two pairs of helical write heads 26, and one pair of erase heads 28), a fixed longitudinal erase head 30, and a fixed longitudinal read/write head 32. Magnetic tape 12 then passes around guide 34 over capstan 36 to be wound on machine reel 38 which rotates around spindle 40. Full width erase head 20 erases the entire width of magnetic tape 12 and is used when data is recorded on virgin tape. It is also used when data is recorded on previously used magnetic tape, if none of the data previously recorded on the magnetic tape is to be preserved and the entire magnetic tape is overwritten with new data.

A host computer 42 transmits a stream of data records to a control unit 44 in helical scan tape drive 10. The data records are formatted for writing on magnetic tape 12 via scanner 22. The tape wrap angle around scanner 22 is greater than 180° so that a pair of helical read heads 24, a pair of helical write heads 26, and one erase head 28 are constantly in contact with magnetic tape 12 to continuously read and write data thereon. Write head pairs 26 simultaneously record two channels of data on a track at a time on magnetic tape 12 with an azimuth angle between adjacent tracks being plus/minus 20°. Similarly, read head pairs 24 simultaneously play back two channels of data on a track at a time for magnetic tape 12. Longitudinal read/write heads 32 read and write data on the corresponding two longitudinal tracks contained on magnetic tape 12: control and time code tracks. Longitudinal read/write heads 32 can be used individually or in any combination when editing new information into pre-recorded data.

Figure 2:
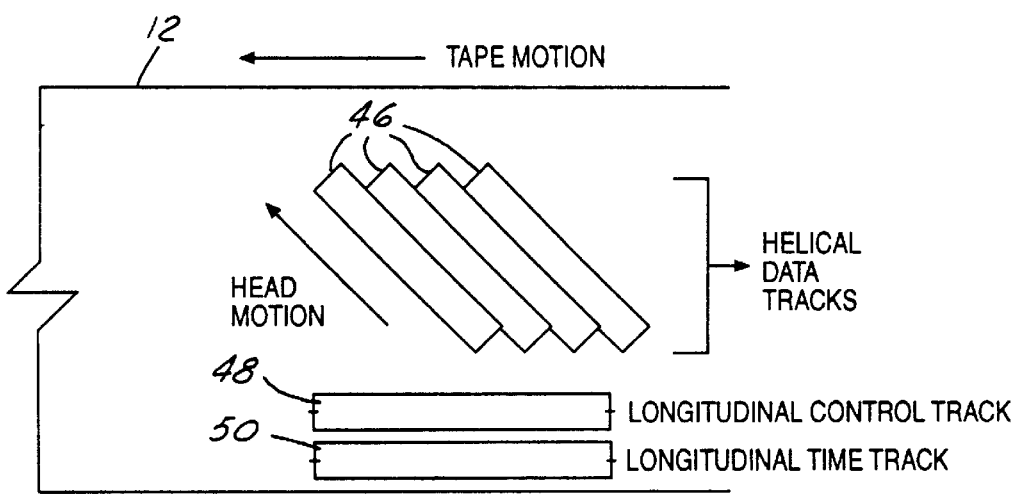
FIG. 2 illustrates the data recording format of a helical scan magnetic tape.

Referring now to FIG. 2, the data recording format of magnetic tape 12 is illustrated. As two adjacent helical write heads 26 of scanner 22 move across magnetic tape 12, two helical tracks 46 of data are simultaneously written onto magnetic tape 12. Once scanner 22 has completed one-half of a revolution, the other pair of helical write heads 26 begins to write the next two adjacent helical tracks 46 onto magnetic tape 12. Magnetic tape 12 also includes two longitudinal tracks: servo control track 48 and time code track 50. Servo control track 48 is recorded as helical tracks 46 are written onto magnetic tape 12. One use of servo control track 48 is to synchronize, during playback, the rotation of scanner 22 with the position of helical tracks 46 on magnetic tape 12. Time code track 50 contains location information that uniquely identifies groups of helical tracks 46.

Figure 3A:
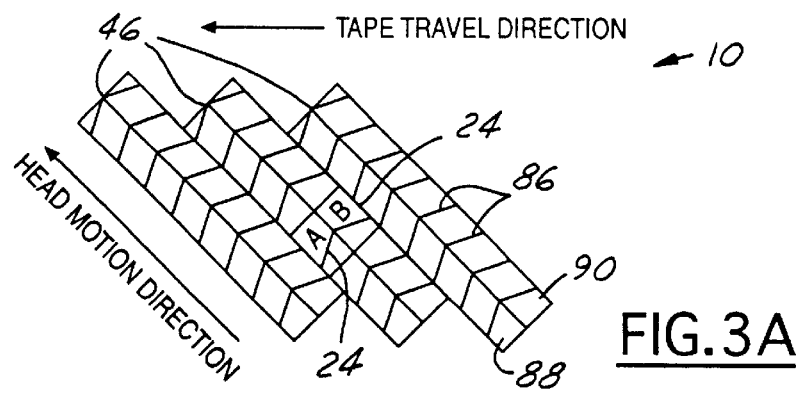
FIGS. 3A and 3B illustrate in greater detail the data recording format of the magnetic tape.
Figure 3B:
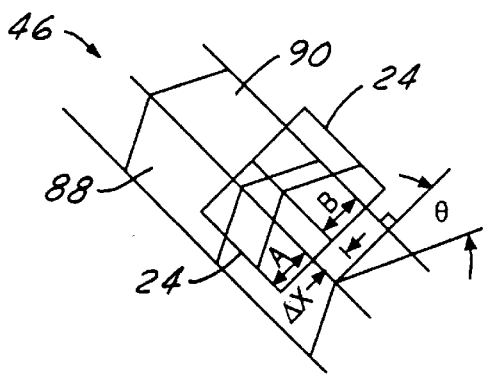

Referring now to FIGS. 3A and 3B, with continual reference to FIGS. 1 and 2, the operation of helical scan tape drive 10 will be described in greater detail. In helical scan tape drive 10, helical tracks 46 are written at an angle with respect to the edge of magnetic tape 12. This is achieved by wrapping magnetic tape 12 partially around angled, rotating scanner 22. Read heads 24 and write heads 26 are precisely aligned in scanner 22 and protrude slightly from its outer surface. As magnetic tape 12 moves past rotating scanner 22, heads 24 and 26 create angled helical tracks 46 on magnetic tape 12 as shown. Each helical track 46 includes a pair of data channels 88 and 90.

Read heads 24 are positioned just behind write heads 26 thereby allowing the data to be verified after it has been written to helical tracks 46. This ensures the initial data integrity of each helical track stripe. On reading back the data, read heads 24 can be made to follow helical tracks 46 with automatic servo head tracking control unit 45.

A preferred method for reading helical tracks 46 with a pair of read heads 24 will now be described. When data is recorded, a sync pattern 86 is inserted at regular intervals on data channels 88 and 90 of helical track 46. If tracking is perfect, there is no time difference in the sync detection. However, when an offset azimuth position difference $\Delta x$ occurs in helical track 46, the azimuth time difference $\Delta t$ of the sync pattern reproduced in the two data channels 88 and 90 is given by the following formula:

$$\Delta t = (2 * \Delta x * TAN(\theta))/v;$$

where $\theta$ is the azimuth angle of read heads 24 with respect to helical tracks 46 and v is the relative velocity between the read heads and the magnetic tape.

Hence, if read heads 24 are off track by $\Delta x$, the azimuth time difference $\Delta t$ can be determined. Conversely, if the azimuth time difference $\Delta t$ is measured, the azimuth position difference $\Delta x$ can be determined. The azimuth position difference $\Delta x$ is used as a position reference for the position control loop.

Figure 4:
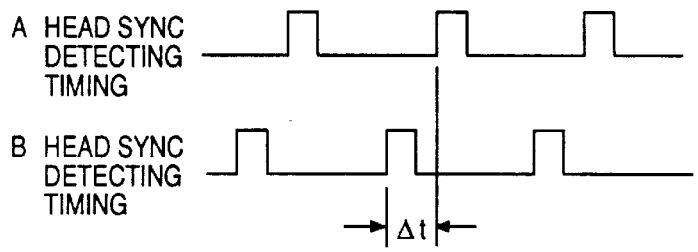
FIG. 4 illustrates the time difference between the sync patterns of the data channels in a helical data track of the magnetic tape.

Referring now to FIG. 4, the azimuth time difference $\Delta t$ between the sync patterns 86 of the two data channels 88 and 90 is shown. The azimuth time difference $\Delta t$ can be translated into the azimuth position difference $\Delta x$ with the use of the above described formula.

The proper operation of prior art helical scan tape drives is based on the assumption that read heads 24 can read sync patterns 86. Read heads 24 cannot properly read the data of data channels 88 and 90 when sync patterns 86 cannot be read. Sync patterns 86 cannot be read due to such things as read heads 24 being off track or tracks 46 being curved. In this case, servo control unit 45 fails to properly follow helical tracks 46 and a tape drive control unit 44 repositions magnetic tape 12 for a read retry. The same process continues until the data is read or a permanent read error is issued after a certain number of normal retries are exhausted.

After the certain number of normal retries are exhausted, track profile mapping error recovery in accordance with the present invention is applied. The logic behind track profile mapping error recovery is a trial and error guess of placing read heads 24 at a proper position with respect to helical track 46 so that the read heads can detect sync patterns 86. The entire track profile for different types of curved tracks are stored in servo system memory 52. The profiles are ordered with the highest probability for the profile to occur to be at the top of the track profile table. The least probable profile is at the bottom of the track profile table. The profiles are selected one at a time with the profile at the top of the table tried first. If the data cannot be read, subsequent profiles are tried until the data can be read. A permanent error is declared after all of the profiles in the table have been exhausted. The profiles are derived from historical data that is obtained during beta testing or from field engineering.

Figure 5:
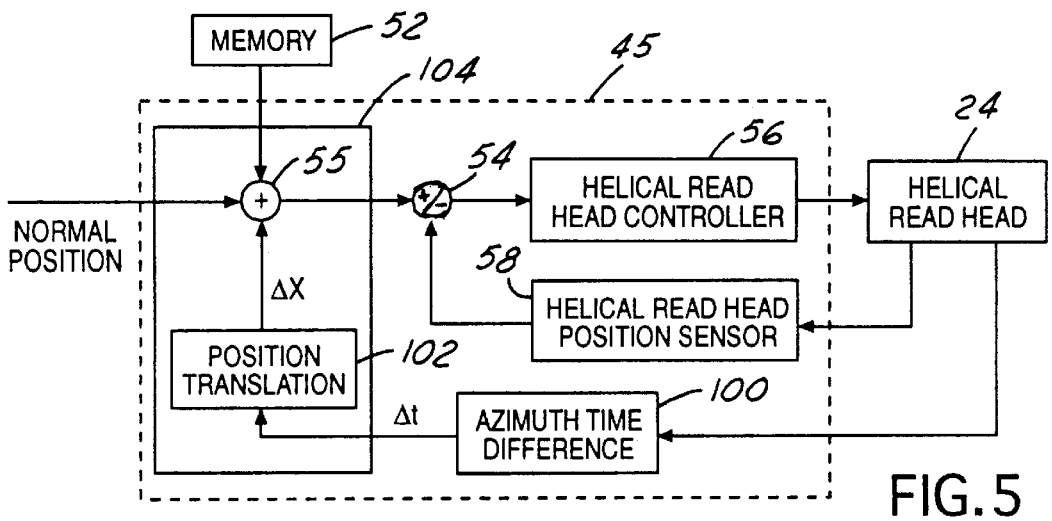
FIG. 5 illustrates in block diagram form the helical read head position control loop of the helical scan tape drive shown in FIG. 1.

Referring now to FIG. 5 with continual reference to FIG. 1, a position control loop of the helical scan tape drive 10 for controlling the position of a pair of read heads 24 is shown. As shown in FIGS. 1 and 5, helical scan tape drive 10 includes non-volatile servo system memory 52 such as PROM, EPROM, etc., connected to servo control unit 45. A helical read head controller 56 controls the position of read heads 24. Azimuth time difference (ATD) block 100 monitors read heads 24 and measures the azimuth time difference $\Delta t$ between sync patterns 86 of two data tracks 46. Position translation block 102 driven by microprocessor unit 104 translates the azimuth time difference $\Delta t$ into the azimuth position difference $\Delta x$. The azimuth position difference $\Delta x$ is indicative of how far read heads 24 are off track. The azimuth position difference $\Delta x$ is then summed by a summation unit 55 with a normal position signal and a profile position signal stored in servo system memory 52. Summation unit 55 then outputs a desired position signal to a summation unit 54 of servo control unit 45. The desired position signal is indicative of the desired position that head controller 56 attempts to move read heads 24.

Position sensor 58 is a mechanical device such as a strain gauge which generates an actual position signal as a function of the actual position of read heads 24 with respect to a known absolute reference. Position sensor 58 provides the actual position signal to head controller 56 via signal summation unit 54. Preferably, position sensor 58 generates an actual position signal sample at predetermined intervals with a fixed number of samples per track. Helical track 46 has a predetermined length such that read heads 24, during normal operation, moves at a predetermined speed to read all of the helical track.

Head controller 56 controls the position of read heads 24 as a function of the desired position signal from microprocessor 104 and the actual position signal from position sensor 58. Head controller 56 attempts to maintain a desired position of read heads 24 with respect to the known absolute reference. The overall objective of servo control unit 45 is to maintain a desired position of read heads 24 with respect to helical tracks 46 such that the read heads provide a proper read back signal.

A problem in the prior art is that if helical tracks 46 are curved, then read heads 24 may provide an improper read back signal. This happens because the components of servo control unit 45 do not have enough bandwidth to position the read heads 24 to the desired position. As a result, head controller 56 cannot move read heads 24 to follow the curvature of a helical track 46 whenever the curvature becomes too severe. If a read back signal from a helical track 46 is improper, head controller 56 controls read heads 24 to back up and reread the helical track during a retry. If the curvature of helical track 46 is too severe, then helical scan tape drive 10 ends up in posting permanent read errors because read heads 24 cannot be moved to a position needed to properly read back the helical track.

An advantage of the present invention is that during a reread attempt, head controller 56 can move read heads 24 to follow the curvature of helical track 46 because servo system memory 52 provides a curve offset signal (i.e., a profile position signal) to the head controller via microprocessor 104. Specifically, summation unit 54 sums the curve offset signal from servo system memory 52, the normal position signal, and the azimuth position difference Δx signal with the actual position signal from position sensor 58 to generate a position difference signal.

Summation unit 54 provides the position difference signal to head controller 56 which moves read heads 24 as a function of the position difference signal. The curve offset signal is provided to compensate for the curvature of helical track 46. The curve offset signal consists of a curve offset signal sample at the predetermined intervals with a finite number of samples per helical track. Summation unit 55 generates the desired position signal at each interval from the associated normal position signal, the curve offset signal, and the azimuth position difference Δx signal.

FIGS. 6(A–I) illustrate a plurality of curved track profiles which are stored in servo system memory 52. Each curved track profile represents a curve offset signal. Microprocessor 104 accesses servo system memory 52 to acquire the curved offset signal. Each curved track profile illustrated consists of samples that describe the position offset of read heads 24 from the center of a straight helical track. The position offset is up to a maximum distance to the right and left (+A and −A, respectively) of the center (0) of the straight helical track.

Figure 6A:
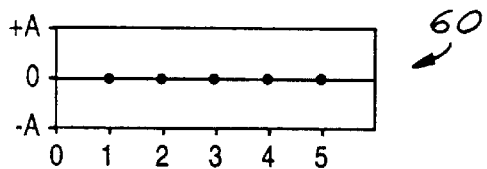
FIGS. 6(A–I) illustrate curved track profiles stored in servo system memory of the helical scan tape drive shown in FIG. 1.
Figure 6E:
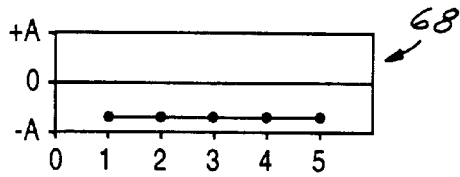
Figure 6B:
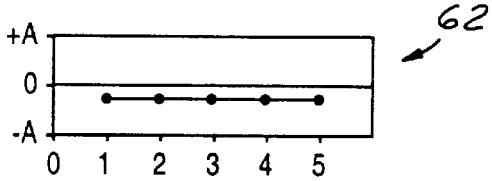
Figure 6F:
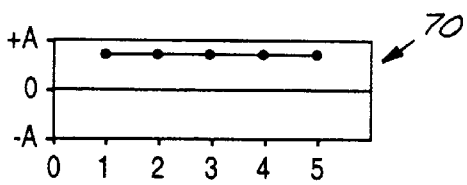
Figure 6C:
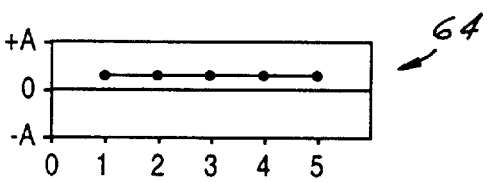
Figure 6G:
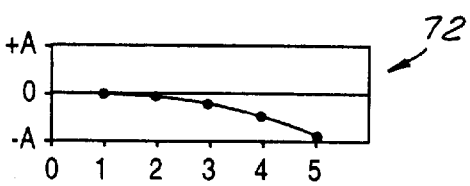
Figure 6D:
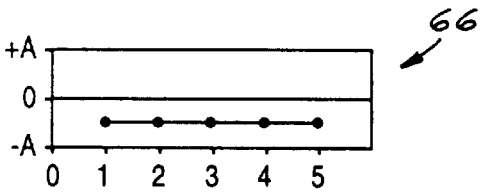
Figure 6H:
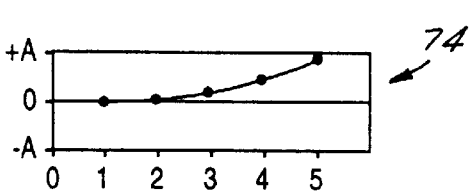
Figure 6I:
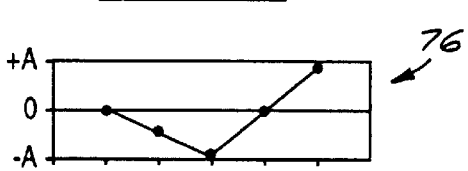

FIG. 6A illustrates a curved track profile 60 for a straight helical track. Because the helical track is straight there is no position offset of read heads 24. FIG. 6B illustrates a curved track profile 62 for a helical track which is slightly curved to the left along the entire helical track length. The position offset of read heads 24 is slightly to the left along the entire helical track length. FIG. 6C illustrates a curved track profile 64 for a helical track which is slightly curved to the right along the entire helical track length. Similarly, the position offset of read heads 24 is slightly to the right along the entire helical track length. FIGS. 6(D–E) illustrate curved track profiles 66 and 68 for a helical track which is curved to the left along the entire helical track length by magnitudes larger than the magnitude of curved track profile 62 illustrated in FIG. 6B. The position offset of read heads 24 is to the left along the entire helical track length for each of curved track profiles 66 and 68. Similarly, FIG. 6F illustrates a curved track profile 70 for a helical track which is curved to the right along the entire helical track length by a magnitude larger than the magnitude of curved track profile 64 illustrated in FIG. 6C. The position offset of read heads 24 is to the right along the entire helical track length.

FIGS. 6(A–F) illustrate linear curved track profiles. Servo system memory 52 may also store non-linear curved track profiles as illustrated in FIGS. 6(G–I). For example, FIG. 6G illustrates a curved track profile 72 for a helical track which is initially straight and then starts to increasingly curve left. FIG. 6H illustrates a curved track profile 74 for a helical track which is initially straight and then starts to increasingly curve right. FIG. 6I illustrates a curved track profile which increasingly curves left and then starts to increasingly curve right.

Servo system memory 52 may contain any number of curved track profiles. Preferably, the curved track profiles represent common curved tracks experimentally observed in typical helical scan tape drives. The curved track profiles are compiled from the historical data collected and represent typically encountered curved helical tracks.

In operation, servo control unit 45 controls the position of read heads 24 over helical track 46 in order to read the helical track and to generate a proper read back signal. If helical track 46 is curved, read heads 24 may have difficulty in reading the helical track. As a result, an improper read back data signal is recovered which cannot be corrected by the ECC. In this case, tape controller unit 44 then commands servo control unit 45 to move tape 12 back for another read attempt of helical track 46. If the reread attempt is successful, tape drive control unit 44 continues to command servo control unit 45 to continue to read the next tracks. If the reread attempt fails, the tape drive control unit 44 repeats the same above procedure until the number of retries are exhausted. After the number of retries is exhausted, tape drive control unit 44 commands servo control unit 45 to enter a special recovery procedure.

In this special recovery procedure, microprocessor 104 selects one of the plurality of curved track profiles stored in servo system memory 52 to be summed with the normal position and the azimuth position difference Δx to generate the desired position signal in summation unit 55. Summation unit 55 provides the desired position signal to summation unit 54. Summation unit 54 compares the desired position signal from summation unit 55 with the actual position signal from position sensor 58 to generate the position difference signal. Head controller 56 drives read heads 26 to the position reference in response to the position difference signal.

If the selected curved track profile is a proper match to the actual track, read heads 24 are now able to follow the curved track and provide a proper read back signal and then normal operation continues. Read heads 24 are then positioned to read the next helical track at the normal operating speed and follow this helical track as a function of the desired position signal that is generated by the summation of the normal position and the azimuth position difference Δx. If read heads 24 are still not able to follow the curved track in order to generate proper read back signal, tape control unit 44 commands servo control unit 45 to move tape 12 back in front of the helical track 46 to attempt another read using the special recovery procedure. Microprocessor 104 of servo control unit 45 selects a different one of the plurality of curved track profiles stored in servo system memory 52. Servo control unit 45 controls read heads 24 based on the position reference that is generated by the summation of the selected curved track profile, the normal position, and the azimuth position difference Δx. This special recovery procedure is repeated until the read heads 24 provide a proper read back signal or until all of the curved track profiles in the curved track table have been applied.

The method of the present invention involves storing in memory the shortest possible list of arbitrary curved track profiles that overlap all possible real curved track shapes. Practically, none of the curved track profiles exactly match the actual curvature of a curved helical track. However, the intent of providing the curved track profile is to bias read heads 24 in the close proximity of the curve such that servo control unit 45 does not need higher bandwidth to follow the curved track. Preferably, the last curved track profile which was used to provide a proper read back signal is the first curved track profile used the next time the special recovery procedure is invoked for another track.

Thus it is apparent that there has been provided, in accordance with the present invention, a helical scan tape drive and method of operation thereof that fully satisfy the objects, aims, and advantages set forth above. While the present invention has been described in conjunction with specific embodiments thereof, it should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A helical scan tape drive comprising:

a read head for reading a helical data track on magnetic tape to generate a read back signal;

a position sensor for generating a position signal indicative of a position of the read head with respect to the helical data track;

memory for storing a plurality of curve offset signals, wherein each one of the plurality of curve offset signals represents a curve profile of a respective given curved helical data track; and a controller for positioning the read head as a function of the position signal and one of the plurality of curve offset signals such that the read head is positioned properly with respect to the helical data track to provide a proper read back signal when the helical data track is curved, wherein the controller selects different ones of the plurality of curve offset signals to control the position of the read head until the read head is positioned properly with respect to the helical data track.

2. The tape drive of claim 1 wherein:

the position sensor is a mechanical device.

3. The tape drive of claim 2 wherein:

the position sensor is a strain gauge.

4. The tape drive of claim 1 wherein:

the position signal includes a plurality of position signal samples and each curve offset signal includes a plurality of corresponding curve offset signal samples.

5. The tape drive of claim 1 wherein:

each curve profile of a respective given curved helical data track is derived from historical data of other helical scan tape drives.

6. A method for reading a helical data track of a helical scan tape drive, the method comprising:

reading a helical data track on magnetic tape with a read head to generate a read back signal;

generating a position signal indicative of a position of the read head with respect to the helical data track;

storing a plurality of curve offset signals in memory, wherein each one of the plurality of curve offset signals represents a curve profile of a respective given curved helical data track;

selecting different ones of the plurality of curve offset signals to control the position of the read head until the read head is positioned properly with respect to the helical data track to provide a proper read back signal when the helical data track is curved; and positioning the read head as a function of the position signal and one of the plurality of curve offset signals such that the read head is positioned properly with respect to the helical data track to provide a proper read back signal when the helical data track is curved.

* * * * *